(12) United States Patent
Sterling

(10) Patent No.: US 11,797,976 B2
(45) Date of Patent: Oct. 24, 2023

(54) CONTACTLESS PAYMENT AND DATA SYSTEMS

(71) Applicant: David Sterling, Greenwich, CT (US)

(72) Inventor: David Sterling, Greenwich, CT (US)

( * ) Notice: Subject to any disclaimer, the term of this patent is extended or adjusted under 35 U.S.C. 154(b) by 111 days.

(21) Appl. No.: 17/681,815

(22) Filed: Feb. 27, 2022

(65) Prior Publication Data

US 2023/0274254 A1   Aug. 31, 2023

(51) Int. Cl.
*G06Q 20/32* (2012.01)
*G06K 19/06* (2006.01)
*G06K 19/077* (2006.01)

(52) U.S. Cl.
CPC ... *G06Q 20/3278* (2013.01); *G06K 19/06037* (2013.01); *G06K 19/07762* (2013.01)

(58) Field of Classification Search
CPC ......... G06Q 20/3278; G06K 19/06037; G06K 19/07762
USPC .......................................................... 705/41
See application file for complete search history.

(56) References Cited

U.S. PATENT DOCUMENTS

| | | |
|---|---|---|
| 2012/0226568 A1 | 9/2012 | Hargraves et al. |
| 2016/0247156 A1 | 8/2016 | Hwang et al. |
| 2018/0091640 A1 | 3/2018 | Fulton et al. |
| 2019/0303931 A1 | 10/2019 | Valencia |
| 2021/0201293 A1* | 7/2021 | Mossoba ................. G06F 1/163 |

* cited by examiner

*Primary Examiner* — Cho Kwong
(74) *Attorney, Agent, or Firm* — Rafael Perez-Pineiro; The Brickell IP Group, PLLC

(57) ABSTRACT

A system for processing electronic information includes a decorative assembly that includes (i) a cap piece having a stud, includes an embedded NFC chip, ornaments around its periphery, and a scannable code located at a center of the cap piece, and (ii) a socket base with a female socket in its center configured to receive the stud and located in an upper section of the socket base, where a bottom section of the socket base includes a PIN that is covered by an opaque peel off sticker. The system also includes a wearable element that is affixed to the decorative assembly, a backend system for processing activation of the decorative assembly or for processing payments by a user of the decorative assembly; and an interface between the decorative assembly and the backend system.

21 Claims, 7 Drawing Sheets

IMITATION GEMSTONE POPPER
BUTTON BRACELET

TOP VIEW

SIDE VIEW

BOTTOM VIEW

GEMSTONE JEWELRY POPPER BUTTON
BRACELET

TOP VIEW

SIDE VIEW

BOTTOM VIEW

CONTACTLESS PAYMENT AND DATA SYSTEMS

FIELD OF THE INVENTION

The present invention generally relates to electronic transaction processing involving use of charms or jewels that incorporate integrated circuits.

BACKGROUND

As humanity continues the transition from paper money and metal coins to sovereign issued digital currencies and other non-sovereign cryptocurrencies (such as Bitcoin), there will be a great need for free and/or appealing smart devices which can be used for digital currency transactions.

COVID-19 has created acute sensitivity to coming in contact with surfaces, and consumers want ways to pay which they feel are safe. The safest way to complete a transaction is to not come in contact with a surface. Small businesses have begun widespread adoption of contactless technologies as a way of providing a safer experience for their employees and customers. Visa's recent "Back to Business" study showed that 82% of small business respondents had embraced digital technology by the end of 2020, and almost all expect contactless payments to increase.

Some countries are seeking to encourage widespread adoption of Sovereign Currencies and Cryptocurrencies in place of traditional paper-based and metal-based currencies. The Bahamas now has their "Sand Dollar" which is a purely digital currency that is backed by the full faith and credit of The Bahamian Government. In El Salvador Bitcoin is now legal tender, and there are Bitcoin ATMs which allow citizens to convert their Bitcoins to US Dollars. Salvadorians can now download the Salvadorian Government's digital wallet, enter their ID number and open a Bitcoin denominated account.

There are several ways to pay in digital currencies including: credit/debit cards, smart phones, and smart watches. One of the most widely available options for people to pay with cryptocurrencies is the "Visa BlockFi Credit Card". This card relies on the Visa blockchain technology to enable transactions in Bitcoin and other digital currencies.

Therefore, in view of these disadvantages, there is a need in the art for an improved system and method to process electronic transactions.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

Disclosed is a system for processing electronic information includes a decorative assembly that includes (i) a cap piece having a stud, includes an embedded NFC chip, ornaments around its periphery, and a scannable code located at a center of the cap piece, and (ii) a socket base with a female socket in its center configured to receive the stud and located in an upper section of the socket base, where a bottom section of the socket base includes a PIN that is covered by an opaque peel off sticker. The system also includes a wearable element that is affixed to the decorative assembly, a backend system for processing activation of the decorative assembly or for processing payments by a user of the decorative assembly; and an interface between the decorative assembly and the backend system.

The present disclosure relates to a system for processing a number of transactions. "Charm Pay" and "Jewel Pay" (two types of decorative assemblies) are smart devices for digital currency transactions which are wearable and contactless. Any merchant with an NFC-chip enabled payment processing terminal can activate the "Pay Charms" and "Pay Jewels", and they provide the consumer with access to a range of digital products and digital services which can improve their lives, and help them make the transition to digital currency.

The Pay Charms may have a minimum pre-loaded charge and may be made of plastic and imitation gemstones. The Pay Charms may be used anywhere there is an NFC enabled credit card terminal. The Pay Charms may be worn and may be used as money, as jewelry, or as an adornment. The Pay Jewels are similar to Pay Charms in functionality except that Pay Jewels may incorporate a microcontroller, memory and an interface with a computer or mobile device, thus providing the user with the ability to conduct more complex transactions.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

Figure 1A:
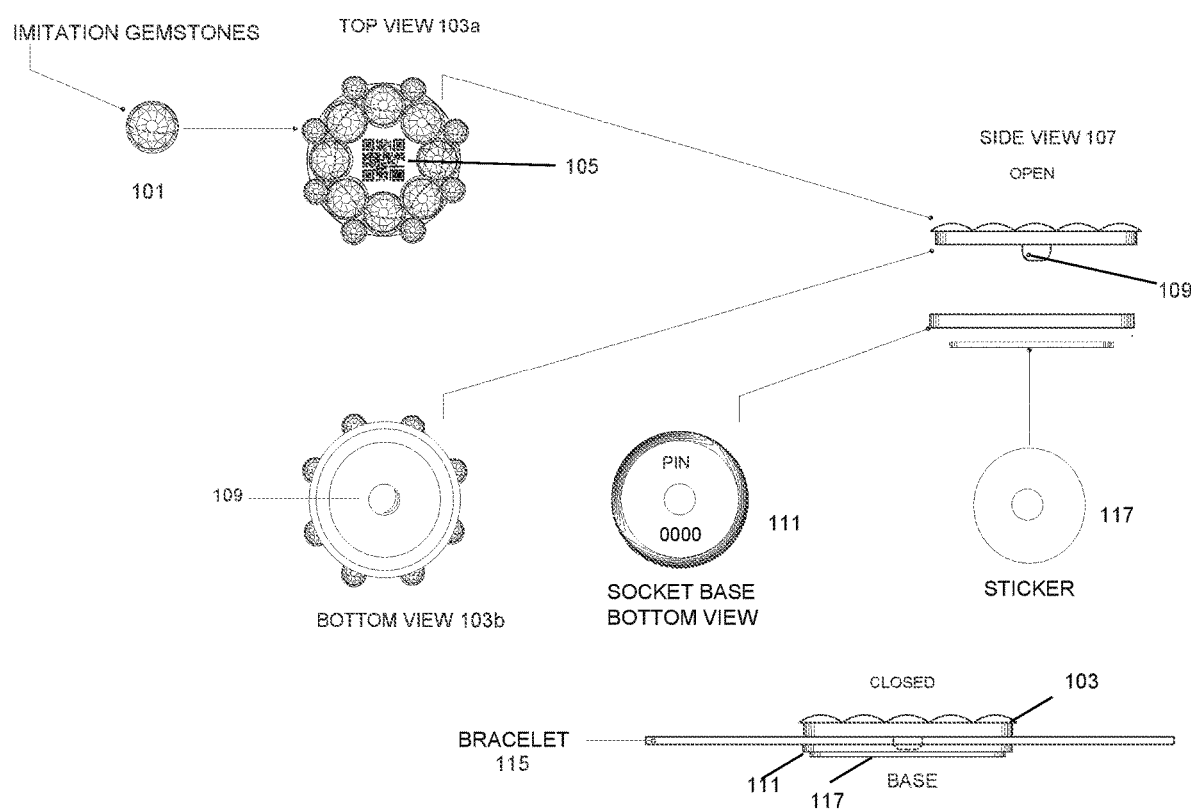
FIG. 1A illustrates the assembly of a Pay Charm in accordance with one embodiment.

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

The present disclosure describes a system that solves the problems with the prior art. The present disclosure relates to a system for processing a number of transactions. "Charm Pay" and "Jewel Pay" may be defined as smart devices for digital currency transactions which are wearable and contactless. Any merchant with an NFC-chip enabled payment processing terminal can activate the "Pay Charms" and "Pay Jewels." "Pay Charms" and "Pay Jewels" provide the consumer with access to a range of digital products and digital services which can improve their lives, and help them make the transition to digital currency.

"Noosa Charms" have been around for many years and are a popular type of costume jewelry which is typically made of plastic or base-metal. Noosa Charms are charms which are snapped into a receiving snap-base. Noosa Charms come in different colors and with different embellishments. Some popular options have rhinestones, enamel, filigree, and logos. Noosa Charms can be worn as jewelry by being attached to a bracelet, necklace, ring, pendant, earring, or fob. Noosa Charms can also be worn by being attached to a belt, shoe, or a hat. Some ways the Noosa Charms can be carried include attached to a phone, keychain, purse, clutch, or a wallet.

"Charm Pay" may be defined as a system of smart and interchangeable "Pay Charms" which are snapped into a receiving base that is attached to anything which is worn or carried. The "Pay Charms" may be traditional "Noosa Charms" which have an embedded NFC enabled chip in the center, a QR Code on the upper side, a PIN Number on the lower side, and an opaque or translucent doughnut-shaped sticker that obscures or covers the PIN number. "Pay Charms" may work on any NFC-enabled contactless payment terminal. At the POS the merchant scans the QR code, removes the sticker from the lower side, and inputs the PIN number on the POS terminal. The merchant can then activate the "Pay Charm" with the monetary value which may be printed on the packaging.

"Pay Charms" may be offered for free with a minimum activation amount which is sufficient to cover costs and to generate a profit. Because the cost of an NFC payment chip is only a few pennies, the most basic form of the product has a nominal production cost. The cost is so low that the charms can be offered for free in relatively low denominations. The nominal entry threshold for consumers means that many economically disadvantaged people throughout world will be able to use the "Pay Charms" and the "Charm Pay" system to utilize digital currencies.

The various "Pay Charm" product lines may be custom tailored to the local and cultural preferences where they are being sold. They may have features which include rhinestones, filigree, images and/or logos.

The cost of the "Pay Charm" system may be covered primarily by merchant transaction fees charged when the consumer utilizes their Pay Charms for transactions. The merchant transaction fees may be commensurate with the percentage rates being charges by Visa™ Mastercard™ and American Express™, and may be estimated to be in the range of 2%-3%. Another major source of income may be generated through the unused balances on the outstanding Pay Charms. For example, according to an estimate from the Mercator Advisory Group, as much as 3% of gift card dollars are never redeemed. It is reasonable to assume that there will be significant unused balance on the Pay Charms, and that the average will be similar to the 3% estimate for gift cards. Visa, Mastercard, Amex and Discover have all developed contactless payments infrastructures which are backed by extensive Block-Fi technology, and may be used for the widespread implementation of "Charm Pay".

"Jewel Pay" may be characterized as a more advanced version of "Charm Pay". One difference between "Jewel Pay" and "Charm Pay" is that there is a cost to buy a "Pay Jewel", whereas the "Pay Charms" may be offered for free (with a minimum load amount). The other enhancements for "Jewel Pay" versus "Charm Pay" include:
  (1) NFC-enabled digital microchip, a microprocessor with varying amounts of digital storage capacity, and a lightning port for connecting to a computer or other smart device;
  (2) Consumer data can be either stored on the digital microchip or in the cloud;
  (3) "Pay Jewel" requires charging and may draw power from whatever smart device or computer it is connected to;
  (4) Functions without consuming power on any NFC enabled terminal based on the data from the QR code on the upper side of the jewel, and the user's PIN number;
  (5) The PIN number can be reset by the user by registering the "Pay Jewel" online and creating an account, with account opening instructions optionally included in the "Pay Jewel" plastic packaging;
  (6) Expensive embellishments including precious metals and precious gemstones;
  (7) "Pay Jewels" may be characterized as a surrogate for traditional jewelry—as long as the "Pay Jewel" snaps into a receiving base it can be made out of practically anything;
  (8) Lights, located in the interior of the "Pay Jewel" and/or exterior of the "Pay Jewel", which could correspond to an amount of money which has been loaded onto the jewel (i.e., Green for newly charged and red for empty), or the lights could be for ornamental purposes;
  (9) A geo-location feature, which when activated, then people with account access can track the location(s) of the "Pay Jewel(s)" that are linked to the account; the geo-location feature is of particular appeal to parents who are concerned for the safety of their children; and
  (10) Parental Controls.

One target market for the "Jewel Pay" system is children, teens and early adolescents. Many of the people in this target demographic range are being supported by their parents. One benefit for parents is that they will be able log into their "Jewel Pay Account" and see all of the purchases made with the "Pay Jewels" which are linked to their account. Not only can parents see how their children are spending their money, but they would be able to block future spending if the "Pay Jewel" is lost or if their children are spending too much.

The cost of the "Pay Jewel" system may be covered primarily by proceeds from the sale of the "Pay Jewel" and by merchant transaction fees which will be changed when the consumer utilizes their "Pay Jewels" for transactions. Another major source of income will be the unused balances on the outstanding "Pay Jewels".

There are multiple applications for the "Jewel Pay" system across industries including jewelry, currency exchange, banking, ticketing, insurance, and hospitality. These applications will be defined in the following sections.

Jewelry.

The "Pay Jewels" may be characterized as a surrogate for traditional high-end jewelry and may feature a range of embellishments including logos, precious-metals, semi-precious gemstones, and precious gemstones. As with "Charm Pay", the "Jewel Pay" charms may be snapped into receiving bases which can be attached to anything which is carried or worn including bracelets, rings, necklaces, pendants, earrings, watches, phones, purses, belts, shoes, etc.

The base models "Pay Jewels" may be similar to the "Pay Charms" with at least one difference being that the "Pay Jewels" may have an NFC-enabled digital microchip with digital storage capacity, and a lighting port for connecting to a computer or other smart device.

Currency Exchange.

In one implementation, the "Charm Pay" and "Jewel Pay" platform may become operational in multiple markets, and may be made available in local currencies. The platform works well for foreign exchange, as the customer could exchange their currency for the local currency, and then have the value credited to their "Pay Charm" or "Pay Jewel". Not only does the transaction accomplish the goal of currency conversion, but the customer goes from having a dirty paper currency to a clean and wearable contactless digital currency with visual appeal. Users will also not have to worry about figuring out and remembering the look and value of foreign coins and currency.

Banking.

There are many banking functions which may be implemented through use of the "Jewel Pay" platform. The "Pay Jewels" may include an NFC-enabled digital microchip with varying amounts of digital storage capacity, and a lightning port for connecting to a computer or other smart device. Once the user connects their "Pay Jewel" to their computer they will be prompted to change their PIN number. In order to change their PIN number, they will need to then set up and activate a "Jewel Pay Account". Once the account has been established, they are open to the entire spectrum of potential banking products and services.

The "Jewel Pay Account" presents the user the option of having their entire balance loaded onto their "Pay Jewel", or to keeping some amount in a "Jewel Bank Account." If they select "Jewel Bank Account" then there will be link(s) to one or several third-party FDIC approved banks which are set up for establishing "Jewel Pay Wallets." Since these all are FDIC approves banks, the applicant may need to prove KYC information. Once the applicant has opened a "Jewel Pay Wallet" they can be cross marketed to the entire range of banking products and services. Consumer and commercial banking applications may require a partnership with a commercial bank.

Debit/Credit.

In one implementation, "Pay Charms" cannot be connected to a computer other than through an NFC connection, and they can only be used for debit transactions up to the limit of the pre-paid balance. The Pay Charm system functions similarly to a traditional store "Gift Card." Pay Charms get activated once and then are usable up to the amount which is loaded by the merchant at the time of activation. By contrast, Pay Jewels have advanced capabilities, including functioning as a pre-paid debit card or as a credit card.

In one implementation, "Pay Jewels" are designed to be connected to a computer, and may be used for both debit and credit functions. As with "Pay Charms," the "Pay Jewels" may be used for debit transactions up to the limit of the pre-paid balance. For the "Pay Jewels" which are linked to a "Jewel Bank Account," the owner can also utilize the balance in their "Jewel Bank Account" account for debit transactions. In addition, if they apply for "Jewel Pay Credit" and are approved, then they can use their "Pay Jewel" for credit transactions as well. Consumer and business deposit and credit applications may require a partnership with a credit card issuer.

Payroll.

The "Jewel Pay" platform is a fast and convenient way for employers to pay their employees. Payroll payments made through the "Jewel Pay" platform may be credited immediately to the employee's "Jewel Pay Wallet". The employee could then access the funds immediately by paying with the "Pay Jewel(s)" that are linked to their "Jewel Pay Wallet". This system is much faster and more convenient than traditional paper-based payroll systems which have a lag in between the time the payment is issued and when the funds are credited to the recipients' account. Payroll applications may require a partnership with a payroll service provider.

Central Bank Disbursements.

The "Jewel Pay" system works with central-bank issued non-digital currencies, central-bank issued digital currencies, and cryptocurrencies. In one implementation, Pay Jewels are linked to the owners' "Jewel Bank Account." Therefore, the user can choose to add funds to their "Jewel Bank Account," and those funds will be immediately available to spend on their Pay Jewel. In one implementation, the main application for Pay Jewels is for the storage and expenditure of sovereign issued FIAT Currencies. The Pay Jewel System can also be utilized for the expenditure of sovereign issued digital currencies and non-sovereign issued cryptocurrencies. The storage and expenditure of digital currencies may make use of a "Digital Currency Wallet." Digital Currency banking applications may require a partnership with a commercial bank or sovereign entity.

The "Jewel Pay" system may be used by central banks for disbursement of traditional non-digital currencies to the populations they serve. When governments make mass disbursements for purposes such as social security or economic stimulus payments, the disbursements are primarily made by direct deposit to the recipient's checking account. Another way that mass government disbursements are made is by paper check and through the country's mail delivery system. The Jewel Pay Account opening process may require that the account be housed with an FDIC insured financial institution, and that the owner go through the US Government's KYC account opening process. Therefore, the US Government could make direct disbursements of social security payments, economic stimulus payments and any other form of central bank issued direct public payment by making direct deposits into the user's FDIC Insured Jewel Pay Account.

The "Jewel Pay" system can be used by central banks for disbursement of new central bank-issued digital currencies to the populations they serve. "Jewel Pay" is an attractive way to encourage people to make the leap to digital currencies. An example of a current sovereign-backed digital currency which could immediately benefit from the "Jewel Pay" technology is the "Digital Bahamian Dollar" aka "Sand Dollar" https://www.sanddollar.bs/. The "Sand Dollar" is the digital version of legal tender (cash) issued by the Central Bank of The Bahamas. Sand Dollar can only be accessed with a mobile phone application or a physical payment card.

The "Jewel Pay" system may be used by central banks for disbursement of cryptocurrencies to the citizens of the nation they serve. In June 2021, the President of El Salvador made Bitcoin the national currency, on par with the current legal tender, the U.S. dollar. The VISA BlockFi card is currently the most widely available method for consumers to pay using Bitcoin.

Ticketing and Admissions.

The "Charm Pay" and "Jewel Pay" systems may be utilized for ticketing and admissions (access entry). The "Charm Pay" and "Jewel Pay" platforms may utilize pre-existing scanning technologies and may be integrated into pre-existing access control systems. Several benefits of the "Charm Ticket" and "Jewel Ticket" system over traditional printed tickets and electronic tickets are:

(1) The Charm/Jewel Ticket can be worn, while a paper ticket cannot be worn;
(2) The Charm/Jewel Ticket does not require an additional device, while an electronic ticket requires a phone;
(3) The Charm/Jewel Ticket is a more permanent memento than paper tickets;
(4) Information for other venue-based add on sales such as parking or pre-paid merchandise may be pre-loaded onto the embedded smart chip;
(5) Almost limitless customizable promotions could be uploaded onto a Charm/Jewel Ticket. A paper ticket only has space for a single promotional offer; and
(6) Charm/Jewel Ticket may be highly personalized, while, on the other hand, paper tickets often look generic.

Hospitality.

The "Charm Pay" and "Jewel Pay" systems may be utilized as room keys. In one implementation, the "Charm Pay" and "Jewel Pay" platforms may utilize pre-existing digital room access control systems. Several benefits of the "Charm Key" and "Jewel Key" system over traditional digital room keys are:

(1) The Charm/Jewel Key can be worn, while a digital room key cannot be worn;
(2) The Charm/Jewel Key is a more attractive memento than a digital room key;
(3) Information for other venue-based add on sales such as parking, pre-paid merchandise may be pre-loaded onto the Charm/Jewel Key;
(4) Almost limitless customizable promotions may be uploaded onto a Charm/Jewel Key while a digital room key does not store any promotional offers; and
(5) Charm/Jewel Keys can be highly personalized, while digital room keys more or less have the same shape and size.

Insurance & Medical

The "Pay Jewels" may store insurance and medical/dental information. The "Pay Jewel" may have internal digital memory which may be utilized for storage of the user's medical and insurance information. They may also have a QR code which once scanned will link to the owner's cloud data through the "Jewel Pay Account" interface. The owner's medical/dental information data may also be available through his or her mobile device through a "Jewel Pay App" interface.

FIG. 1A illustrates the assembly of a Pay Charm in accordance with one embodiment. The Pay Charm may be characterized as a decorative assembly comprising different parts in one embodiment. A cap piece 103 of the Pay Charm (alternatively referred to as the top piece or upper piece) is shown from a top view perspective (103a) in FIG. 1A. The cap piece 103 incorporates imitation gemstones 101 around its periphery in one embodiment. The center of cap piece 103 includes a QR code 105 in one embodiment.

An NFC chip may be embedded inside the stud portion 109 (alternatively referred to as a protruding male snap) of the cap piece 103 or it may be embedded elsewhere within the cap piece 103 or within the socket base 111 (alternatively referred to as the receiving base). Numeral 103b identifies a bottom view of the cap piece 103, showing the stud 109.

The socket base 111 may be shaped as a disk with a female socket in its center that receives the stud 109 to form the Pay Charm in a closed configuration, for example, when the Pay Charm is affixed to a snap bracelet 115. The bottom of the socket base 111 includes a printed PIN (for example, 0000) that may be covered by an opaque peel off sticker 117 that either obscures or is used to conceal the PIN. In an alternative embodiment the PIN may be printed on the bottom of the cap portion 103 and the stud 109 may be inserted into a bracelet, for example, that has a built in female socket.

Figure 1B:
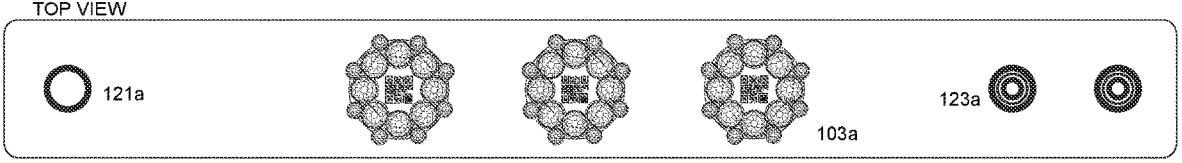
FIG. 1B illustrates the assembly of a Pay Charm affixed to a bracelet in accordance with one embodiment.
Figure 1B:
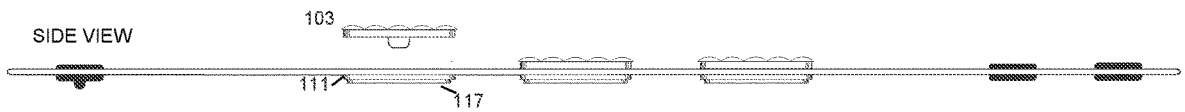
Figure 1B:
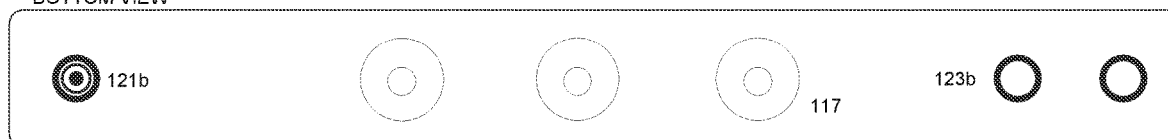

FIG. 1B illustrates the assembly of a Pay Charm affixed to a bracelet in accordance with one embodiment. FIG. 1B illustrates three different views of a snap bracelet: a bottom view, a side view, and a top view. The Pay Charms may be affixed to the bracelet 115 by pushing the cap portion 103 so that the stud 109 is inserted into an orifice of the bracelet, which is received by the socket base 111 at the other side of the bracelet, with the stud 109 and the socket base 111 becoming secured. The sticker 117 may then be applied to the bottom surface of the socket base 111 to conceal or obscure the PIN. The snap bracelet 115 includes several snap buttons 123 (numeral 123a identifies a top view and 123b identifies a bottom view), any one of which may be plugged into snap button 121 (numeral 121a identifies a top view and 121b identifies a bottom view) to secure the bracelet to a person's wrist in accordance with one embodiment.

Figure 2A:
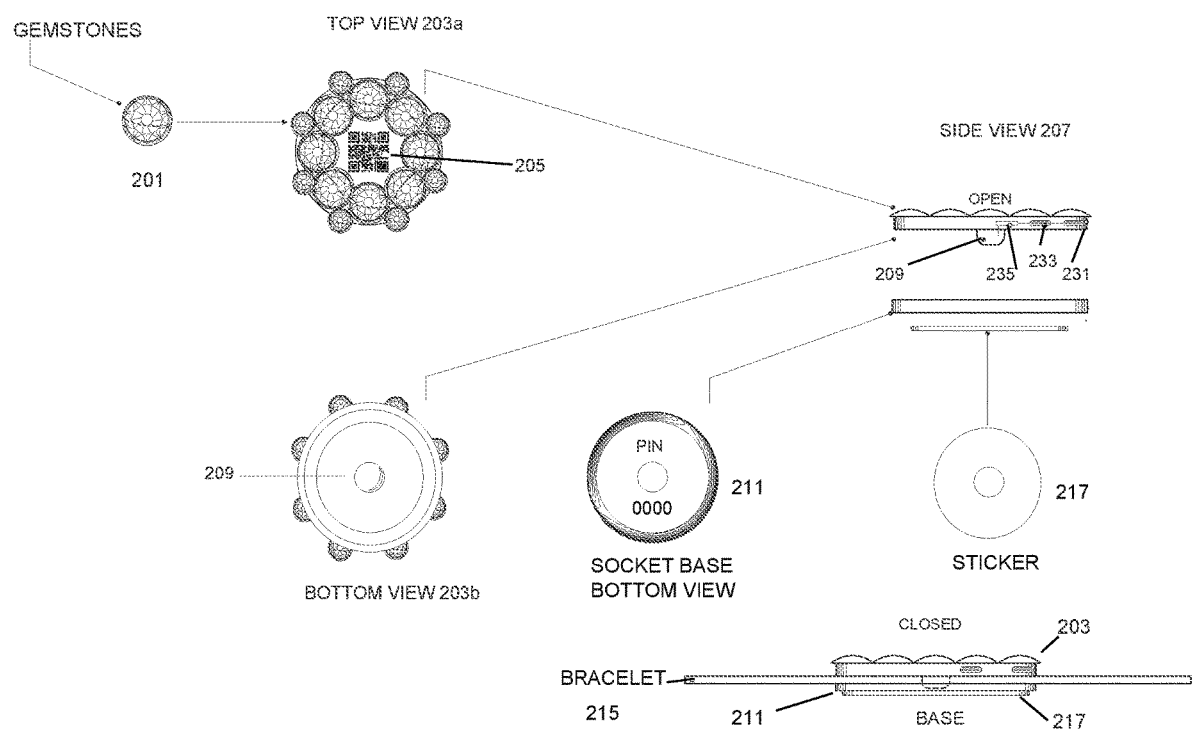
FIG. 2A illustrates the assembly of a Pay Jewel in accordance with one embodiment.

FIG. 2A illustrates the assembly of a Pay Jewel in accordance with one embodiment. The Pay Jewel may be characterized as a decorative assembly comprising different parts in one embodiment. A cap piece 203 of the Pay Jewel (alternatively referred to as the top piece or upper piece) is shown from a top view perspective 203a in FIG. 2A. The cap piece 203 incorporates gemstones 201 (for example diamonds) around its periphery in one embodiment. The center of cap piece 203 includes a QR code 205 in one embodiment.

An NFC chip may be embedded inside the stud portion 209 (alternatively referred to as a protruding male snap) of the cap piece 203 or it may be embedded elsewhere within the cap piece 203 or within the socket base 211 (alternatively referred to as the receiving base). Numeral 203b identifies a bottom view of the cap piece 203, showing the stud 209.

In one embodiment, a difference between a Pay Charm and a Pay Jewel consists in the Pay Jewel including a lighting port 231 for charging the power source of the Pay Jewel and for exchanging communications with a computer, tablet or mobile device, for example, an interface circuitry 233 between the lightning port 231 and a microprocessor 235 with a memory (with a memory size that may vary based on desired capability). The microprocessor 235 in the Pay Jewel is powered by a rechargeable power source, such as a battery, and may in turn be coupled with the NFC circuit.

The socket base 211 may be shaped as a disk with a female socket in its center that receives the stud 209 to form the Pay Charm in a closed configuration, for example, when the Pay Charm is affixed to a bracelet 215. The bottom of the socket base 211 includes a printed PIN (for example, 0000) that is covered by an opaque peel off sticker 217 which either obscures or is used to conceal the PIN.

Figure 2B:
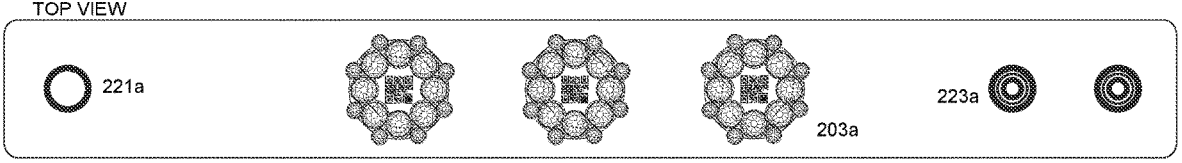
FIG. 2B illustrates the assembly of a Pay Jewel affixed to a bracelet in accordance with one embodiment.
Figure 2B:
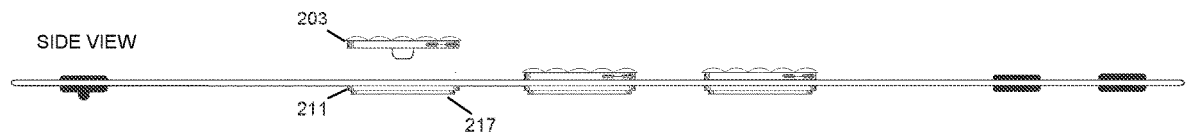
Figure 2B:
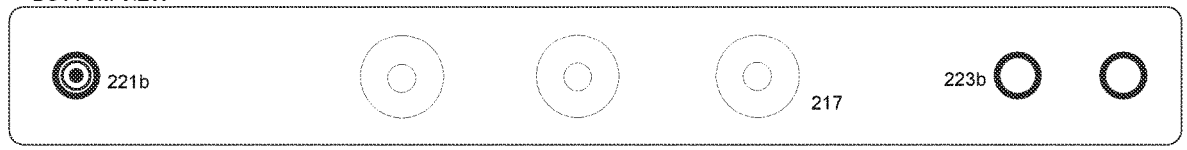

FIG. 2B illustrates the assembly of a Pay Jewel affixed to a bracelet 215 in accordance with one embodiment. FIG. 2B illustrates three different views of a snap bracelet: a bottom view, a side view, and a top view. The Pay Charms may be affixed to the bracelet 215 by pushing the cap portion 203 so that the stud 209 is inserted into an orifice of the bracelet, which is received by the socket base 211 at the other side of the bracelet, with the stud and the socket becoming secured. The sticker 217 may then be applied to the bottom surface of the socket base 211 to conceal or obscure the PIN. The snap bracelet includes several snap buttons 223 (numeral 223a identifies a top view and 223b identifies a bottom view), any one of which may be plugged into snap button 221 (numeral 221a identifies a top view and 221b identifies a bottom view) to secure the bracelet to a person's wrist in accordance with one embodiment.

Figure 3:
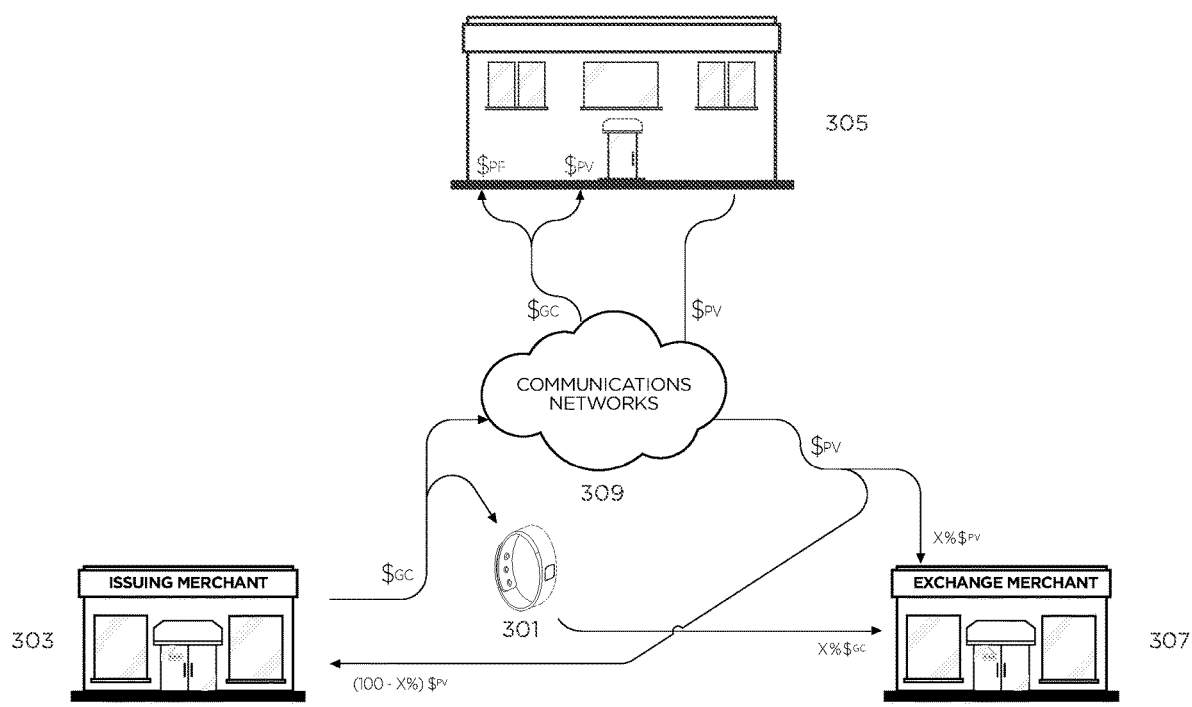
FIG. 3 illustrates a system for accepting payments in accordance with one embodiment.

FIG. 3 illustrates a system for accepting payments in accordance with one embodiment. A gift card processing system using the disclosed Pay Charm and Pay Jewel is disclosed.

In one embodiment, the Charm Pay & Jewel Pay system may be used for payments. Once the PIN number has been exposed after peeling off the sticker, the Pay Charm and Pay Jewel can be used for payment on any NFC-enabled chip reader.

The Pay Charm and Pay Jewel may use the same activation process as most department store gift cards. Gift cards issued by department stores typically have a PIN. It is usually found on the back of the card underneath an area that must be scratched off to view. In accordance with the disclosed implementation, a sticker may be used to conceal the PIN. The sticker helps prevent the PIN number from being stolen before the Pay Charm or Pay Jewel is authorized, enabled, or activated. After the Pay Charm or Pay Jewel is activated by the selling merchant on an NFC enabled payment terminal, it can be used without the PIN number. In one embodiment, the Pay Charm is active until the balance is exhausted. Pay Jewels may be reloaded.

In one embodiment, a consumer may use the PIN to register their Pay Charm or Pay Jewel online. The system may rely on NFC-enabled contactless payment terminals, which can be used to either process a payment, or to increase the amount of money loaded onto the Pay Jewel, for example.

The PIN number may function as a digital key to the interface with the backend online system. Once the consumer creates an online profile, the customer will be able to use the Jewel Pay system for various applications, including adding funds to the Pay Jewel, and to suspend access to funds (primarily for parental control).

Referring to FIG. 3, a customer first purchases a Pay Charm or Pay Jewel 301 through any merchant, such as an issuing merchant 303 or a secondary Pay Charm or Pay Jewel vendor. In one embodiment. the merchant issued Pay Jewel 301 may be assigned a unique identifier, such as a 12-16-digit reference number or character set. The unique identifier may be provided in an electronically readably format. The electronically readably format can be provided via an embedded programmable circuit, and the like. For example, the unique identifier may be stored in the Pay Jewel memory or smart chip in one embodiment.

The merchant issued Pay Jewel 301 can have a pre-established value (for example, Pay Charm) or have a value established at the time of purchase (for example, Pay Jewel), wherein the Pay Charm or Pay Jewel value is referenced as $GC. The value $GC of the merchant issued Pay Jewel 301 can be adjusted in accordance with transactions, lower than and up to the established, pending value of the merchant issued Pay Charm or Pay Jewel 301 at the time of the transaction.

The card reference number, the issuing merchant information, and respective value $GC are conveyed to a clearinghouse 305 through a communications network. The information transfer step 204 utilizes a communication network 309 for communicating between various locations, such as the issuing merchant 303 and the clearinghouse 305. The actual monetary amount $GC is transferred from the issuing merchant 303 (or other actual card retailer) to the clearing house 305 via any physical or electronic funds transferring means known by those skilled in the art. The value $GC of the merchant issued Pay Jewel 301 may be apportioned into a processing fee $PF and a processed value $PV. The processing fee $PF may be a small percentage of the initial card value $GC provided to the clearinghouse 305 for managing the merchant issued Pay Jewel 301 value and effecting any transaction. The clearinghouse 305 receives the processing fee $PF. The effective value $PV of the merchant issued Pay Jewel 301 is placed into an account for payment of a future transaction in accordance with a gift card valuation banking process, for example.

To complete a purchase using the Pay Charm or Pay Jewel, the Pay Charm or Pay Jewel 301 may be presented to a point-of-sale ("POS") device at a merchant's facility. For example, the NFC chip embedded on the Pay Charm or Pay Jewel may be used to exchange data (e.g., the unique identifier) with an NFC reader of the POS device, in accordance with one embodiment. In another embodiment the QR code printed on the Pay Jewel may be scanned by a QR reader of the POS device such that the POS device can acquire the unique identifier associated with the Pay Jewel.

The merchant issued Pay Charm or Pay Jewel 301 can be used for a value of up to the Pay Jewel value $GC. In one embodiment, for a transaction utilizing the maximum value of the merchant issued Pay Charm or Pay Jewel 301, the merchant receives an amount being the gift card value $GC subtracting the processing fee $PF, which equals the effective value $PV. Should the transaction be less than the maximum value of the merchant issued Pay Charm or Pay Jewel 301, the merchant receives the amount of the transaction, subtracting a percentage respective to the processing fee $PF. The clearinghouse 305 to a merchant (for example, issuing merchant 303) payment process is referred to as a merchant payment process.

Also illustrated in FIG. 3 is a foreign merchant 307 (designated as exchange merchant), which may be defined as a merchant in a foreign country. The purchaser can also complete a purchase transaction in a foreign country in accordance with one embodiment. If the customer or holder of the Pay Charm or Pay Jewel desires to make a purchase at the exchange merchant 307, the customer can use the merchant issued Pay Charm or Pay Jewel 301 for completing a payment transaction as described above, with the exception that the transaction will be completed at the exchange rate set by the exchange merchant 307.

In one embodiment, the exchange merchant 307 can determine the adjusted gift card monetary value x %$GC, wherein x % is representative of the exchange rate. The adjusted gift card monetary value x %$GC may be deducted from the total amount of the transaction. The exchange merchant 307 communicates with the clearinghouse 305 via the communication network 309, requesting information pertaining to the merchant issued Pay Charm or Pay Jewel 301. The transaction provides the reference number of the merchant issued Pay Charm or Pay Jewel 301, and in turn requests validation of the merchant issued Pay Charm or Pay Jewel 301, the exchange rate x %, and the pending balance $.GC, and then the exchange merchant 307 continues with the transaction. Upon completion of the transaction, the monetary value x %$PV is transferred from the clearinghouse 305 to the exchange merchant 307 via an exchange merchant payment process.

There are several additional main banking functions which can be done utilizing the Charm Pay or Jewel Pay platform illustrated in FIG. 3. For general banking services a "Jewel Pay" with a reloadable chip may be used. One potential banking application for the Jewel Pay platform is payroll. The Jewel Pay platform is a fast and convenient way for employers to pay their employees. Payroll payments made through the Jewel Pay Platform may be credited immediately to the employee's Jewel Pay account. This system is much faster and more convenient than traditional paper-based payroll systems which have a lag between when the payment is issued and when the funds are credited to the recipients' account.

Figure 4:
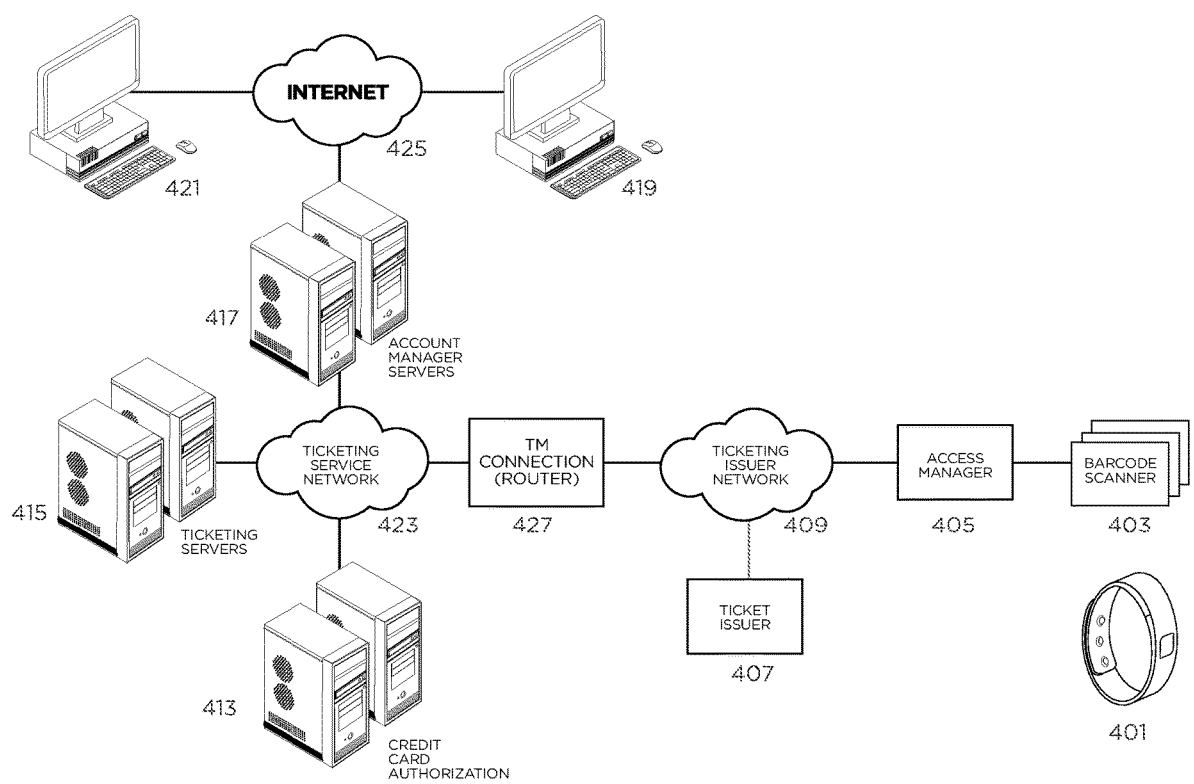
FIG. 4 illustrates a system for access entry in accordance with one embodiment.

FIG. 4 illustrates a system for access entry in accordance with one embodiment. Specifically, FIG. 4 illustrates exemplary hardware components and software components that can be invoked during the processes for use of the disclosed Pay Jewel to permit access or admission to a venue. An example ticketing system operated by a ticket processing service or other entity can include ticketing servers 415, account manager servers 417, a credit card authorization system 413, a network, 423, and a router 427. The ticketing system can host a Web site accessible by users of the disclosed Pay Jewels for purchasing, selling, and transferring tickets.

As depicted, users of the Pay Jewel may access the ticket processor ticketing system over the Internet 425 using respective PCs 421, 419. In addition, or alternatively, users can access the ticketing system via other general-purpose computers that have access to the Internet, via networked personal digital assistants, phones, interactive televisions, or other user terminal types. The user terminals 421, 419 may run commercially available Web browser applications, such as those which implement the basic World Wide Web standards such as HTTP and HTML, or other types of applications that access data from networked sites.

The user terminals 421, 419 may also run a commercially available e-mail application, which may be used to receive communications from the ticketing system. The e-mail application and the browser may be integrated with one another, and/or may be integrated with other application programs or the operating system. The terminals 421, 419 can include displays, keyboards, memory storage devices, printers, and the like. In one embodiment, when mobile devices are used in lieu of terminals 421, 419, the mobile device may run an application that allows linking the Pay Jewel to the ticketing application, such that when a ticket is purchased or acquired for permitting access to a venue, the ticket information is uploaded to the Pay Jewels via a smart chip embedded with Pay Jewel or through an NFC chip embedded with the Pay Jewel, which may communicate with the mobile device to transfer the ticket information. Alternatively, the ticket information may be linked to a QR code of the Pay Jewel through an application such that the Pay Jewels do not require uploading of ticket information, but rather the ticket information would reside in the backend servers and can be accessed for permitting access to a venue when the QR code of the Pay Jewel 401 is scanned at the venue's location through QR/barcode scanner 403. When the ticket information is uploaded into the Pay Jewel 401, the ticket information may be accessed through an NFC reader embedded with scanner 403.

The ticket processing ticketing system can include one or more databases, such as a user account database, that stores user contact information, billing information, preferences, account status, and the like, that can be accessed by other portions of the ticketing system, such as by account manager servers 417. Similarly, one or more ticket databases accessible by the ticketing system can include ticket information records for tickets, including QR/barcode information, event name, event date, seat identifier, ticket holder name or other identifier of a current ticket holder, names, or other identifiers of past holders of the ticket, a ticket valid/invalid indicator, and an indicator that as to whether the ticket has been used.

As further depicted by FIG. 4, a ticket issuer, which can be a sports team, venue operator, ticketing agency, or the like, accesses the ticketing system via the router 427. The ticket issuer can have a ticket issuer ticket system 407 that hosts an application, such as Ticketmaster's commercially available Archtics™ application, that may be used to define events, set ticket prices, and provide real-time integration with the ticket processor ticketing system. In addition, via the system 407, the ticket issuer can optionally define customized invoices, tickets, receipts, labels, and other correspondence. The system 407 optionally allows the ticket issuer to define at least portions of the Web pages that will be displayed to users, such as by defining logos, fonts, colors, and the like.

The system 407 is connected to an intranet and/or the Internet 409 to thereby access the router 427, access management system 405, and to receive data from a QR/barcode scanner 403. In one embodiment, the access management system 405 may be implemented as the server-based Access Manager™ system that is commercially available from Ticketmaster. The access management system may be used to authenticate electronic ticket proffered at an event venue through use of the Pay Jewel 401.

The access management system 405 utilizes the QR code/barcode information scanned from a Pay Jewel 401 using the scanner 403 to perform the authentication. The access management system servers can optionally use a database and/or an encryption/decryption algorithm for ticket identification lookup. By way of example, the ticket issuer ticketing system 407 generates ticket QR codes or barcodes.

The ticket issuer then sells tickets, such as season tickets, either directly or via the ticketing service ticket processing system. For example, the ticket issuer can authorize payment via the Pay Jewel 401, a credit card, debit charge, or otherwise. Tickets may be posted, via the account manager 417, for sale on the Web site hosted by the ticketing system. A record of the posting can be stored in the ticket database, which can be stored on the ticketing system 407, the account manager servers 417, and/or the ticketing servers 415.

A user of the Pay Jewel can initiate, authorize payment, and complete a purchase of one or more of the posted tickets via the user terminal 421 or a mobile device. If the user is paying by credit card or the Pay Jewel 401, the credit card authorization system 413 checks to make sure the credit card and/or Pay Jewel 401 is authorized and has not exceeded its credit limit or balance.

When the user of the Pay Jewel 401 attempts to access entry to a venue through use if the scanner 403, the access management system 405 will compare the scanned QR code/barcode information with that stored in the access management system database, and determine whether the ticket information is valid (e.g., has not been used before to gain access).

The Jewel Pay system may be utilized for ticketing and admissions. The Pay Jewel may include a QR code or bar code for scanning at a venue where admission is sought, and an embedded digital smart chip. The Jewel Pay platform can utilize pre-existing scanning technologies and can be integrated into pre-existing access control systems.

Figure 5:
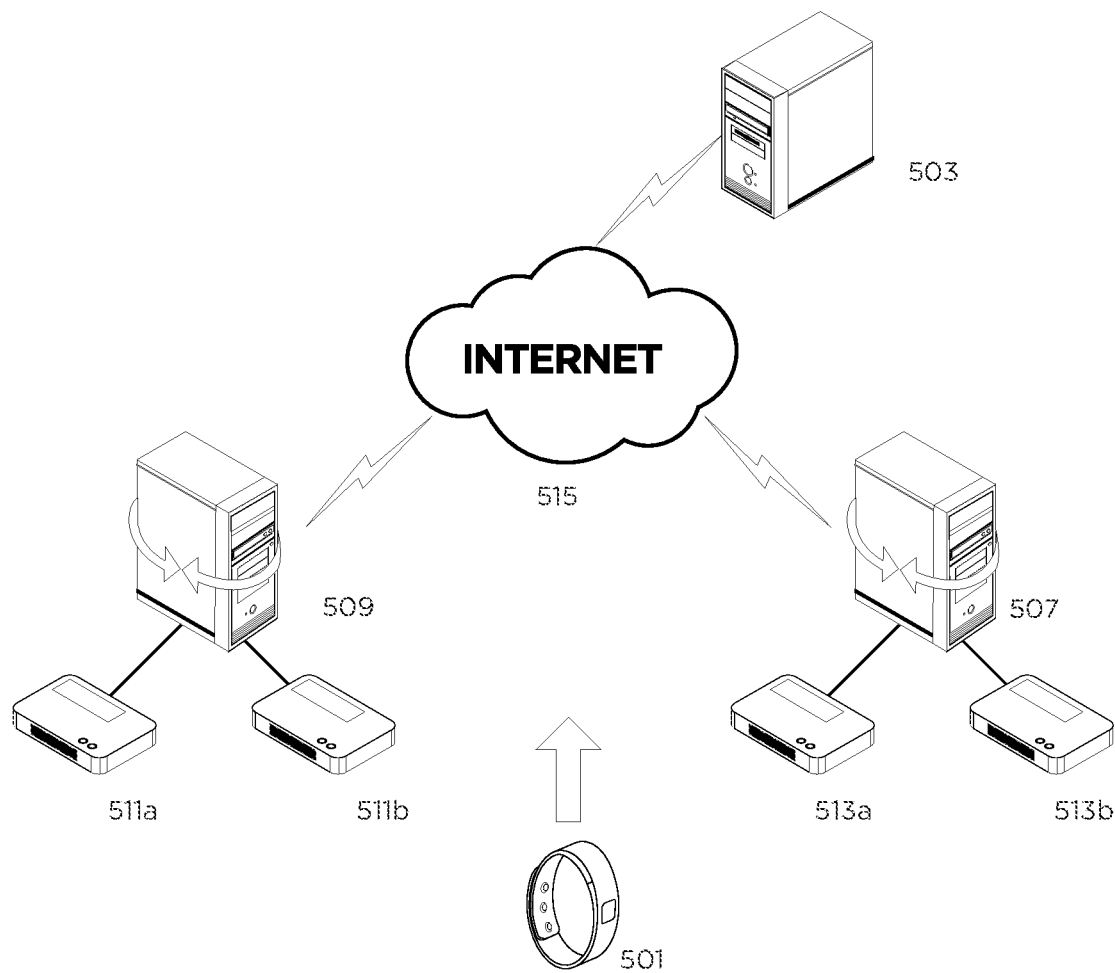
FIG. 5 illustrates a cloud storage system in accordance with one embodiment.

FIG. 5 illustrates a cloud storage system in accordance with one embodiment. Since the Pay Jewel utilize smart chip technology, it may be used for data storage. In one embodiment, it functions like a portable hard drive, and it may include smart chips with varying amounts of data storage capacity.

Another smart application for the Jewel Pay platform is for cloud storage. For this purpose, the data may be stored in the cloud and/or on the Pay Jewel—or only in the cloud. The smart chip may act as a key, which in combination with a pin or biometric scan, may provide access to the user's cloud data.

Referring to FIG. 5, a network structure is illustrated according to an example of the disclosure. A cloud server 503 may establish connection with several intelligent gateways located in different areas via Internet. For instance, the cloud server 503 may connect with intelligent gateway 509 and intelligent gateway 507, respectively. Relay devices 511a and 511b may access a network through the intelligent gateway 509, and relay devices 513a and 513b may access a network through the intelligent gateway 507. Pay Jewel 501 may support many wireless authentication protocols. In a unified authentication mode, if intend to access several different WLANs, Pay Jewel 501 may be subject multiple wireless access authentications according to the wireless authentication protocols supported by wireless APs of each WLAN. For instance, in case that relay devices 511a-b and 513a-b are based on different authentication protocols, when a Pay Jewel 301 interact with those relay devices (through NFC connection, for example), the user of the Pay Jewel will perform predetermined authentication action for the Pay Jewel according to the respective authentication protocols of the relay devices, such as inputting a password for authentication authority, entering the PIN, scanning a QR code through an interface or through the smart chip embedded in the Pay Jewel.

According to the method for wireless access authentication, an intelligent gateway may be previously associated with account information of an account registered on the intelligent gateway on a cloud server. The account information may include identity information such as a username, password for verification authority, and information of a trusted terminal device corresponding to the account. When receiving an access authentication packet, the intelligent gateway may construct an identity verification packet by using authentication identification of a terminal device to access a WLAN, which is carried in the access authentication packet, and identity information (such as a username) of an account previously registered on the intelligent gateway. When the cloud server determines the Pay Jewel corresponding to the access authentication identification as a trusted Pay Jewel according to the access authentication identification and the association account identification, the Pay Jewel corresponding to the access authentication identification is permitted to pass the access authentication. Consequently, when the Pay Jewel intends to access multiple different WLANs, this method may be used for unified authentication instead of security verification for each WLAN. In this way, operations on wireless access authentication can be reduced and less authentication information during the authentication process will be generated, which avails to intelligent gateway management. This in turn, allows access of data stored in the cloud server through an authentication process used by the Pay Jewel.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means—plus-function format and are not intended to be interpreted based on 35 U.S.C. 112(f), unless and until such claim limitations expressly use the phrase "means for" followed by a statement of function void of further structure.

The invention claimed is:

1. A system for processing electronic information comprising:
   a decorative assembly, comprising
      a cap piece having a stud, wherein the cap piece includes a Near Field Communication (NFC) chip embedded within the cap piece, ornaments around a periphery of the cap piece, and a scannable code located at a center of the cap piece, and
      a socket base with a female socket in its center configured to receive the stud and located in an upper section of the socket base, wherein a bottom section of the socket base includes a PIN that is covered by an opaque peel off sticker;
   a wearable element having an orifice, wherein the decorative assembly is affixed to the wearable element when the stud is inserted through said orifice and received by the female socket of the socket base at an opposite side of a point of insertion of the stud so that the cap piece and socket base become secured;
   a backend system processing activation of the decorative assembly or processing payments by a user of the decorative assembly; and
   an interface between said decorative assembly and said backend system,
   wherein the interface receives data stored in said NFC chip, said scannable code, or the PIN number.

2. The system of claim 1, wherein said socket base is shaped as a disk.

3. The system of claim 1, wherein said ornaments include imitation gemstones.

4. The system of claim 1, wherein said scannable code is a QR code.

5. The system of claim 1, wherein said wearable element includes one of a bracelet, a ring, a necklace, a pendant, an earring, a watch, a phone, a purse, a belt, or a shoe.

6. The system of claim 1, wherein the cap piece further comprises:
   a microprocessor with memory and coupled to the NFC chip and a power source;
   a port for charging the power source and exchanging communications with a computer, tablet or mobile device; and
   an interface circuitry for connecting the port with the microprocessor and the power source.

7. The system of claim 6, wherein said socket base is shaped as a disk.

8. The system of claim 6, wherein said ornaments include gemstones.

9. The system of claim 6, wherein said scannable code is a QR code.

10. The system of claim 6, wherein said wearable element includes one of a bracelet, a ring, a necklace, a pendant, an earring, a watch, a phone, a purse, a belt, or a shoe.

11. The system of claim 6, wherein said backend system processes payments to said user, access entry, or access to a cloud server.

12. A decorative assembly, comprising:
   a cap piece having a stud, wherein the cap piece includes a Near Field Communication (NFC) chip embedded within the cap piece enabling communication with a payment terminal, ornaments around a periphery of the cap piece, and a scannable code located at a center of the cap piece; and
   a socket base with a female socket in its center configured to receive the stud and located in an upper section of the socket base, wherein a bottom section of the socket base includes a PIN that is covered by an opaque peel off sticker;
   wherein the decorative assembly is affixed to a wearable element having an orifice when the stud is inserted through said orifice and received by the female socket of the socket base at an opposite side of a point of insertion of the stud so that the cap piece and socket base become secured.

13. The decorative assembly of claim 12, wherein said socket base is shaped as a disk.

14. The decorative assembly of claim 12, wherein said ornaments include imitation gemstones.

15. The decorative assembly of claim 12, wherein said scannable code is a QR code.

16. The decorative assembly of claim 12, wherein said wearable element includes one of a bracelet, a ring, a necklace, a pendant, an earring, a watch, a phone, a purse, a belt, or a shoe.

17. The decorative assembly of claim 12, wherein the cap piece further comprises:
   a microprocessor with memory and coupled to the NFC chip and a power source;
   a port for charging the power source and exchanging communications with a computer, tablet or mobile device; and
   an interface circuitry for connecting the port with the microprocessor and the power source.

18. The decorative assembly of claim 12, wherein said socket base is shaped as a disk.

19. The decorative assembly of claim 12, wherein said ornaments include gemstones.

20. The decorative assembly of claim 12, wherein said scannable code is a QR code.

21. The decorative assembly of claim 12, wherein said wearable element includes one of a bracelet, a ring, a necklace, a pendant, an earring, a watch, a phone, a purse, a belt, or a shoe.

\* \* \* \* \*